US007649562B2

(12) United States Patent
Misawa et al.

(10) Patent No.: US 7,649,562 B2
(45) Date of Patent: Jan. 19, 2010

(54) PORTABLE ELECTRONIC DEVICE HAVING AN OPERATION INPUT SECTION

(75) Inventors: Takeshi Misawa, Asaka (JP); Toshita Hara, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 440 days.

(21) Appl. No.: 10/152,678

(22) Filed: May 23, 2002

(65) Prior Publication Data

US 2002/0176016 A1    Nov. 28, 2002

(30) Foreign Application Priority Data

May 28, 2001 (JP) ............................ P2001-159136

(51) Int. Cl.
*H04N 3/14* (2006.01)
*H04N 7/14* (2006.01)

(52) U.S. Cl. .............................. 348/333.01; 348/14.07; 345/173

(58) Field of Classification Search ............. 348/333.01
See application file for complete search history.

(56) References Cited

U.S. PATENT DOCUMENTS

| 5,598,527 | A | | 1/1997 | Debrus et al. | |
|---|---|---|---|---|---|
| 6,057,833 | A | * | 5/2000 | Heidmann et al. | 715/726 |
| 6,154,210 | A | * | 11/2000 | Anderson | 715/840 |
| 6,369,803 | B2 | * | 4/2002 | Brisebois et al. | 345/173 |
| 6,433,801 | B1 | * | 8/2002 | Moon et al. | 715/840 |
| 6,469,797 | B2 | * | 10/2002 | Sakai | 358/1.15 |
| 6,597,400 | B2 | * | 7/2003 | Nishimura | 348/333.02 |
| 6,611,285 | B1 | * | 8/2003 | Morita | 348/211.3 |
| 6,760,074 | B1 | * | 7/2004 | Maruyama et al. | 348/375 |
| 6,778,217 | B1 | * | 8/2004 | Nishimura | 348/333.12 |
| 6,867,764 | B2 | * | 3/2005 | Ludtke | 345/173 |
| 6,919,927 | B1 | * | 7/2005 | Hyodo | 348/333.02 |
| 7,088,343 | B2 | * | 8/2006 | Smith et al. | 345/173 |
| 2001/0013897 | A1 | * | 8/2001 | Kowno et al. | 348/240 |
| 2002/0101512 | A1 | * | 8/2002 | Klapman et al. | 348/207 |
| 2004/0233274 | A1 | * | 11/2004 | Uyttendaele et al. | 348/36 |
| 2005/0263026 | A1 | * | 12/2005 | Aosaki et al. | 101/492 |

FOREIGN PATENT DOCUMENTS

| JP | 5-207343 A | 8/1993 |
|---|---|---|
| JP | 6-208433 A | 7/1994 |
| JP | 11-194863 A | 7/1999 |
| JP | 11-194872 A | 7/1999 |
| JP | 11-195353 A | 7/1999 |
| JP | 11-212726 A | 8/1999 |
| JP | 2000-122779 A | 4/2000 |
| JP | 2001-56746 A | 2/2001 |

* cited by examiner

*Primary Examiner*—Tuan Ho
*Assistant Examiner*—Hung H Lam
(74) *Attorney, Agent, or Firm*—Birch, Stewart, Kolasch & Birch, LLP

(57) ABSTRACT

A digital camera according to the invention comprises a power switch, lenses, an optical finder, a shutter button, an auxiliary light emitting section, a recording media slot, an image monitor, and touch pads. The touch pads form part of the touch input section for selecting and inputting the items and selections displayed on the image monitor, part the touch input section for operating the display contents of an image displayed on the image monitor, and part of the touch input section for controlling the shooting magnification used in shooting an image. Such input operations are performed by way of a contact position signal of the touch pads as well as a movement in the touch state.

3 Claims, 9 Drawing Sheets

PORTABLE ELECTRONIC DEVICE HAVING AN OPERATION INPUT SECTION

BACKGROUND OF THE INVENTION

1. Field of the Invention

The present invention relates to portable electronic apparatus, and in particular to portable electronic apparatus where configuration of the operation input section is improved.

2. Description of the Related Art

Portable electronic apparatus such as a digital camera has required more and more operation members as the apparatus goes multi-functional. Meanwhile, requests for a more compact and lower-profile apparatus design and a larger display screen are getting more and more earnest. Such a trend makes it difficult to arrange a great number of operation members in a limited operation section. Thus, apparatus has been proposed wherein a touch panel on the display screen of the display section is used to reduce the size of the operation section. Such apparatus is disadvantageous in that the user directly touches his/her finger on the display screen thus soiling the screen.

Apparatus has been proposed where a touch input section is arranged around the display section including touch detection sensors arranged linearly and continuously (refer to the Japanese Patent Laid-Open Hei 11-194872 and Japanese Patent Laid-Open Hei 11-195353). This apparatus only allows the user to select items displayed in the touch input section, which results in an unsatisfactory operability.

SUMMARY OF THE INVENTION

The invention, in view of the aforementioned circumstances, aims at providing portable electronic apparatus with compact and low-profile apparatus design and improved operability.

The invention is portable electronic apparatus having a display unit wherein a touch input section is provided including touch detection sensors arranged linearly and continuously around the display unit and wherein one operation chosen from a group of control operation of the portable electronic apparatus or input operation that is based on the items displayed on the display unit is performed in accordance with the touch position and a movement in the touch state detected by the touch input section.

The touch detection sensors of the portable electronic apparatus according to the invention are provided approximately in parallel with the periphery of the display unit.

The display unit of portable electronic apparatus according to the invention is approximately in rectangular shape and the touch detection sensors are provided approximately in parallel with two sides of the display unit orthogonal to each other.

The touch detection sensors of the portable electronic apparatus according to the invention are formed approximately in the form of the letter L and the touch input section is activated upon a touch on the corner of the letter L. Further, a touch on the corner of the letter L is used for direct input of predetermined information.

The input operation on the portable electronic apparatus according to the invention is performed by a movement of position in the touch state after selections for the item corresponding to the touch position are displayed.

Control operation of the portable electronic apparatus according to the invention in accordance with a movement in the touch state on the touch input section includes changing the display magnification of an image displayed on the display unit.

Control operation of the portable electronic apparatus according to the invention in accordance with a movement in the touch state on the touch input section includes changing the display area of an image displayed on the display unit.

Control operation of the portable electronic apparatus according to the invention in accordance with a movement in the touch state on the touch input section includes continuous frame advance of an image displayed on the display unit.

Portable electronic apparatus according to the invention is a digital camera and control operation of the portable electronic apparatus according to the invention in the touch state on the touch input section includes changing the shooting magnification.

The touch detection sensors of the portable electronic apparatus according to the invention comprise touch pads.

The touch detection sensors of the portable electronic apparatus according to the invention comprise contact switches.

The contact switches of the portable electronic apparatus according to the invention comprise a membrane switch.

The invention is portable electronic apparatus having a display unit, the apparatus comprising a tilt switch and a touch input section including touch detection sensors arranged linearly and continuously, wherein the touch input section is provided on the surface of the tilt member of the tilt switch and wherein control operation of the display contents of the display unit is performed in accordance with a movement in the touch state detected by the touch input section.

Control operation of the display contents of the display unit of the portable electronic apparatus according to the invention includes continuous frame advance of an image displayed on the display unit.

The tilt switch of the portable electronic apparatus according to the invention has a feature to change the display magnification of an image displayed on the display unit and Control operation of the display contents of the display unit includes changing the display area of an image displayed on the display unit.

DESCRIPTION OF THE PREFERRED EMBODIMENTS

Embodiments of the invention will be described using a digital camera as an example of portable electronic apparatus while referring to drawings.

First Embodiment

Figure 1A:
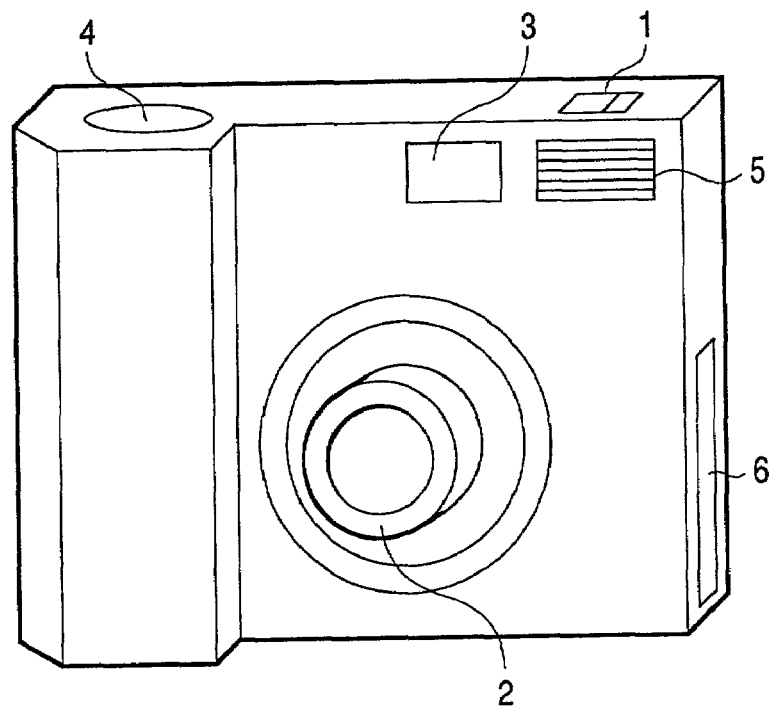
FIGS. 1A and 1B are perspective views of a digital camera according to the fist embodiment.
Figure 1B:
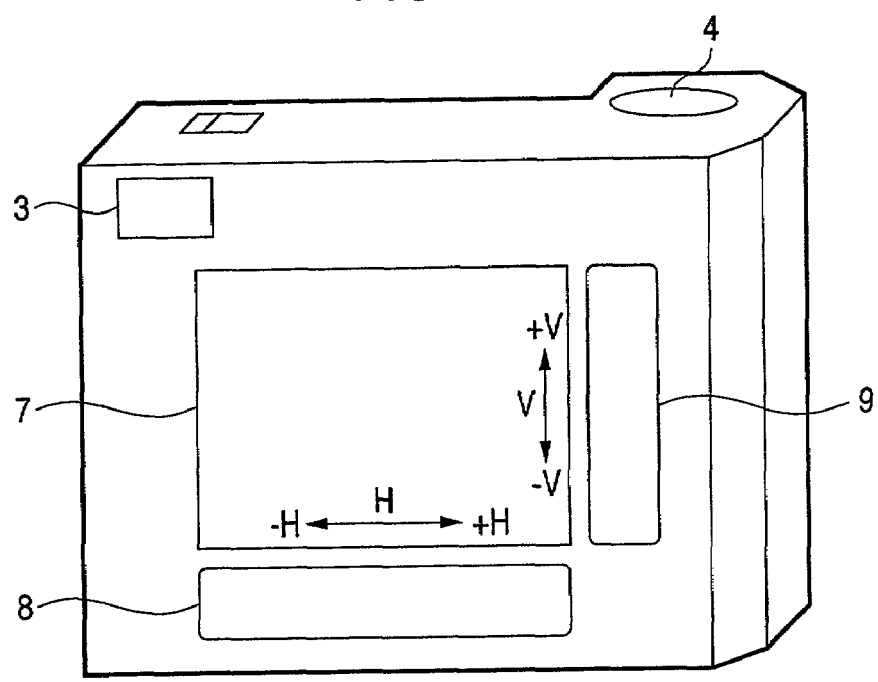

The first embodiment will be described using FIGS. 1A through 7. FIG. 1A and FIG. 1B are front and rear perspective views of a digital camera according to the fist embodiment. A digital camera in FIGS. 1A and 1B comprises a power switch 1, a lens 2, an optical finder 3, a shutter button 4, an auxiliary light emitting section 5, a recording media slot 6, an image monitor 7, and touch pads 8, 9.

Of the digital camera in FIGS. 1A and 1B, the power switch 1 also serves as a shooting mode/playback mode selector switch of the digital camera. The auxiliary light emitting section 5 emits an auxiliary light when illuminance is low, and may be an electronic flash or an LED.

Touch pads 8, 9 are touch detection sensors to detect contact of a finger of an operator. The touch pad 8 is provided approximately in parallel with the direction of H (horizontal direction) of the image monitor 7 and outputs a contact position signal in the direction of H. The touch pad 9 is provided approximately in parallel with the direction of V (vertical direction) of the image monitor 7 and outputs a contact position signal in the direction of V. The touch pads 8, 9 thus detect one-dimensional (linear) contact positions virtually continuously. Thus, the width of a touch pad 8, 9 has only to be large enough to detect a contact of a finger of the operator.

The touch pads 8, 9 form part of the touch input section for selecting and inputting the items and selections displayed on the image monitor 7. The touch pads 8, 9 also form part of the touch input section for operating the display contents of an image displayed on the image monitor 7. The touch pads 8, 9 further form part of the touch input section for controlling the shooting magnification used in shooting an image. Such input operations are performed by way of a contact position signal of the touch pads 8, 9 as well as a movement in the touch state.

Figure 2:
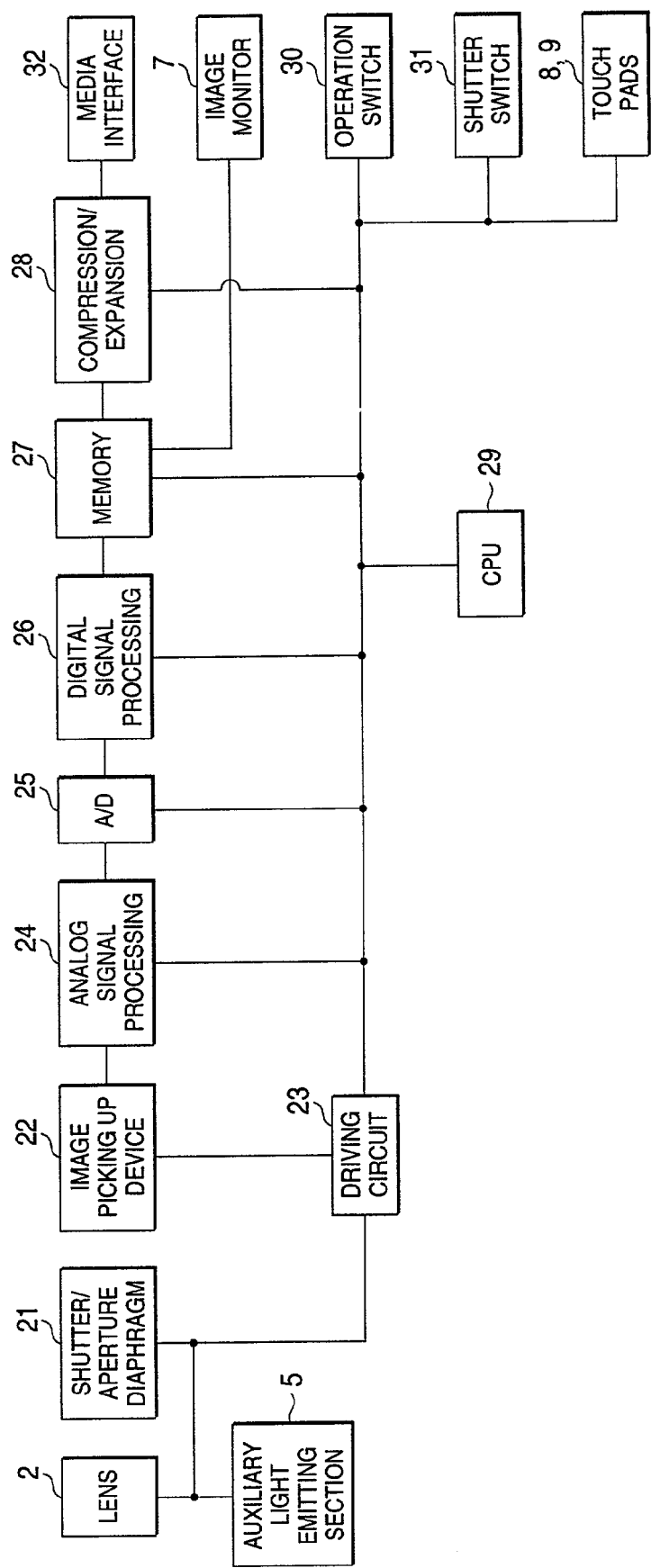
FIG. 2 is a general block diagram of a digital camera in FIG. 1A and FIG. 1B.

FIG. 2 is a general block diagram of a digital camera in FIG. 1A and FIG. 1B. The digital camera comprises a shooting section comprising a lens 2, a shutter/aperture diaphragm 21, an image picking up device 22, an auxiliary light emitting section 5 and a driving circuit 23, a signal processor including an analog signal processor 24, an A/D converter 25, a digital signal processor 26, an output memory 27 and a compression/expansion section 28, an output section including a media interface 32 and an image monitor 8, an operation section including an operation switch 30, a shutter switch 31 and touch pads 8, 9, and a CPU 29 for controlling the entire digital camera. Hereafter, "aperture diaphragm" will simply be referred to as "diaphragm" if this reference cannot be taken misunderstandingly.

Configuration of the shooting section and the signal processor is the same as that of a related art digital camera, so that it will be only outlined. A light passing the lenses 2 and the shutter/diaphragm 21 achieves a focus on an image picking up device such as a CCD and a shot image signal is acquired. The shutter serves to prevent smears that may occur when a signal is read from the image picking up device 22. The image picking up device 22, triggered by turning ON the shutter switch 31, is driven by the driving circuit 23 with a predetermined timing to output an image signal. The driving circuit 23 may be omitted depending on the driving voltage conditions of the image picking up device 22.

The image signal undergoes analog signal processing then A/D conversion. The image signal then undergoes digital signal processing and is temporarily recorded in the output memory 27. In case the image signal is to be displayed on the image monitor, the contents of the output memory 27 is read and sent to the image monitor 8. A shot image in the output memory 27 is compressed in the compression/expansion section 28 and recorded on a recording medium such as a memory card (not shown) via the media interface 32. Compressing processing may be omitted depending on the shooting mode.

In case an image recorded on a recording media is to be displayed on the image monitor, the image information read from the recording media is expanded in the compression/expansion section 28 and written into the output memory 27, then sent to the image monitor 8.

These operations are performed under the control by the CPU 23 in accordance with operation switches 30 including the power switch 1, a shutter switch 31 operated via the shutter button 4, and a position detection signal of the touch pads 8, 9. The CPU 23 determines a movement in the finger-contact state by a variation in the position detection signal of the touch pads 8, 9.

Figure 3:
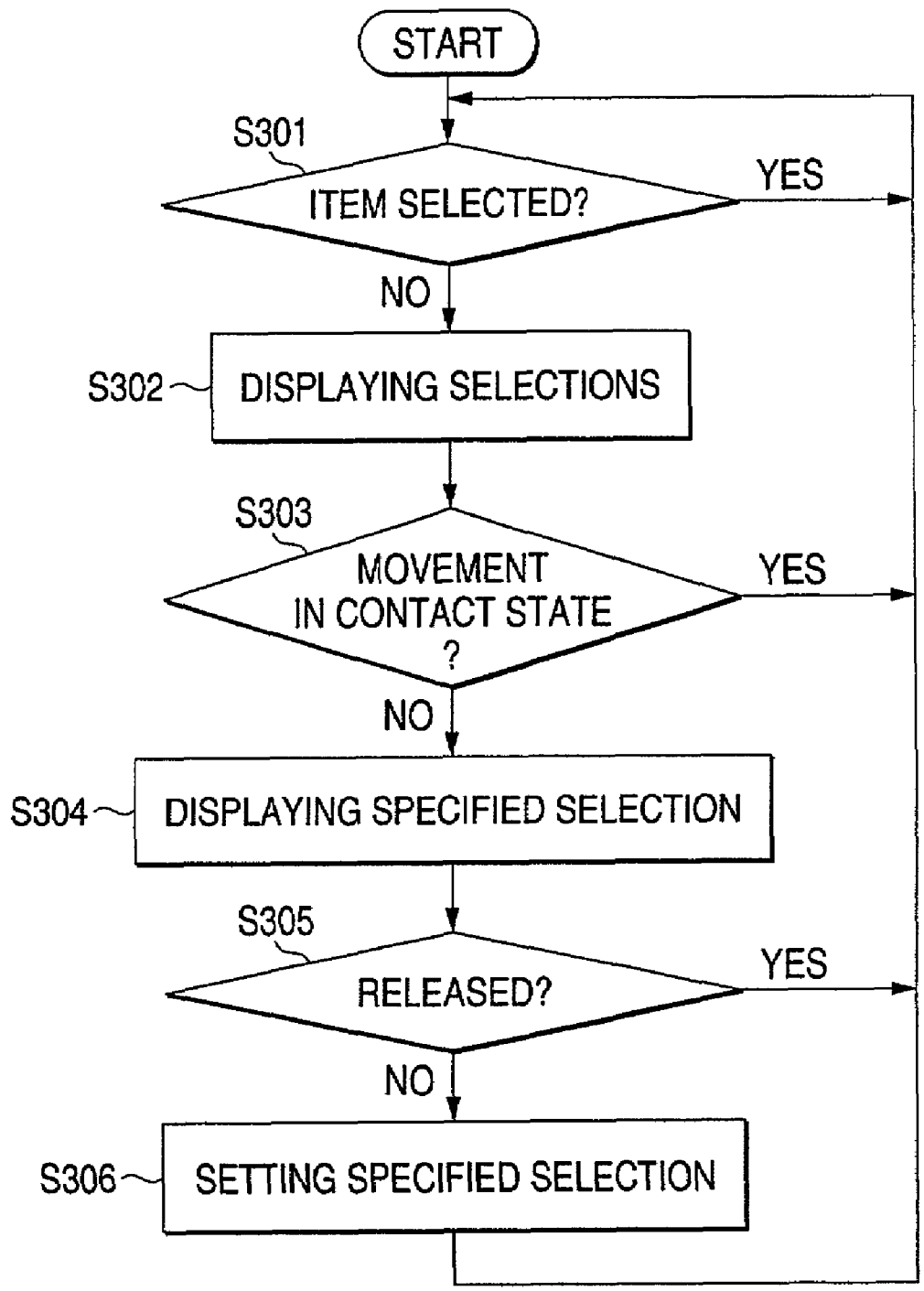
FIG. 3 is a general flowchart of setting operation by way of menu selection.
Figure 4:
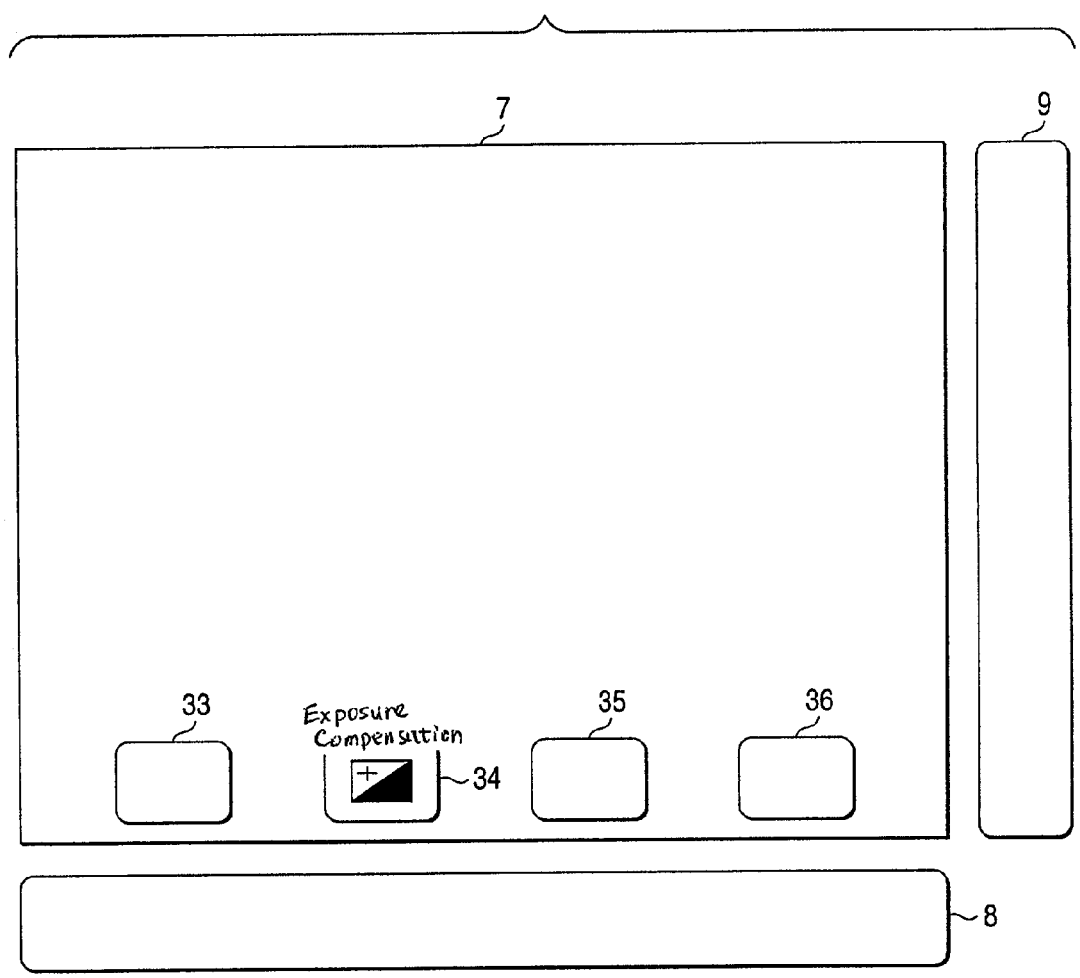
FIG. 4 shows an example of screen display in the shooting mode.
Figure 5:
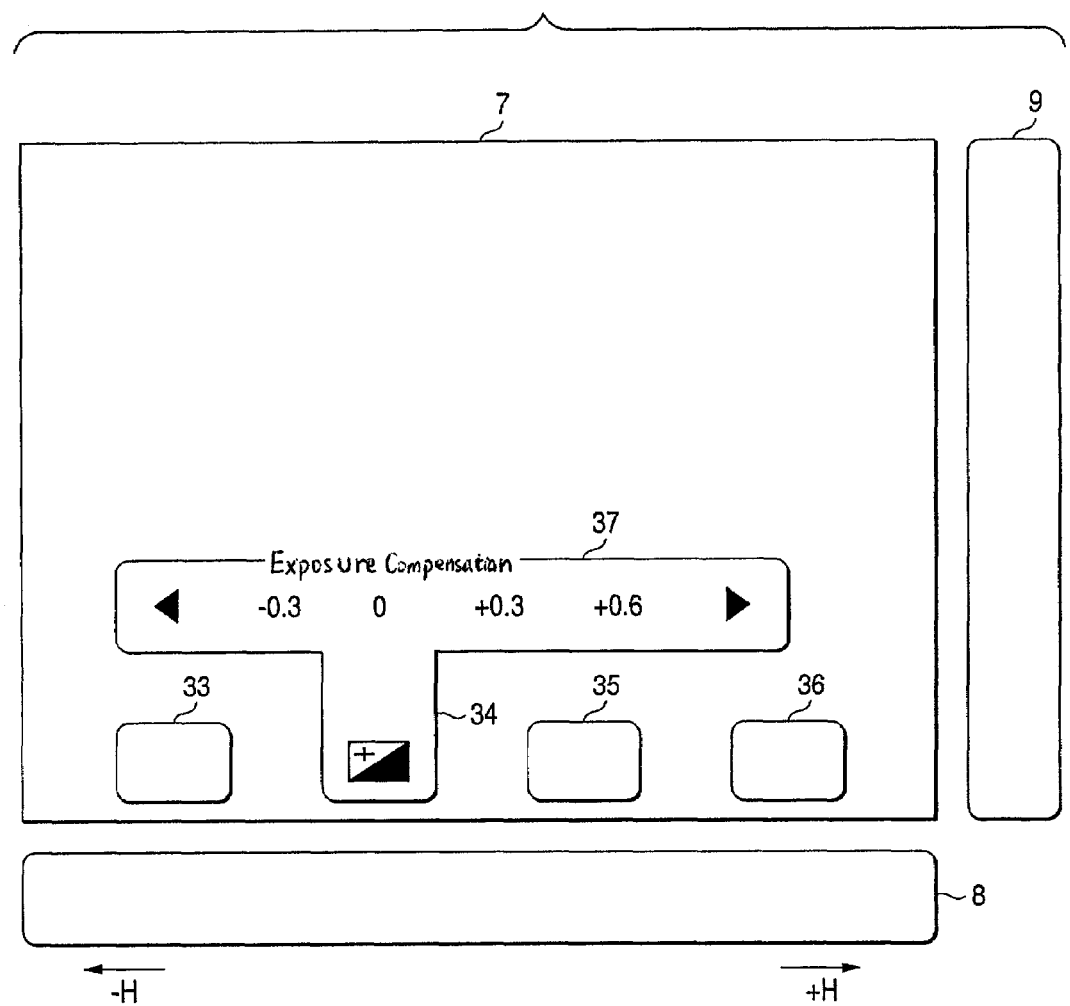
FIG. 5 shows an example of screen display obtained when an item menu mark is selected.

Setting operation using the touch pads 8, 9 will be described using the flowchart shown in FIG. 3. Setting of the shooting operation mode is allowed when shooting an image. Setting the shooting mode by using the power switch 1 displays a plurality of item menu marks 33 through 36 including the brightness setting menu mark 34, as shown in FIG. 4. Bringing a finger to come in contact with the touch pad 8 below the menu mark 34 (step 301) displays the screen shown in FIG. 5 and selections 37 of the item corresponding to the item menu mark 34 (step 302). In this state, moving your finger in the direction of +H or −H while keeping your finger on the touch panel (step 303) specifies one of the selections (step 304). In this state, releasing your finger from the touch pad 8 (step 305) sets the specified selection (step 306).

In case both touch pads 8 and 9 are used, it is possible to use the touch pad 8 to select a predetermined item to display selections and specify one of the selections while bringing your finger to come in contact with the touch pad 9.

Control operation of the digital camera by using the touch panels 8, 9 will be described. An example of control operation is changing the shooting magnification in shooting images. Change of the shooting magnification is made by moving your finger while keeping it on the touch pad 9. That is, moving your finger in the direction of +V while keeping your finger on the touch pad 9 provides a zoom-in operation; moving your finger in the direction of −V provides a zoom-out operation.

Figure 6A:
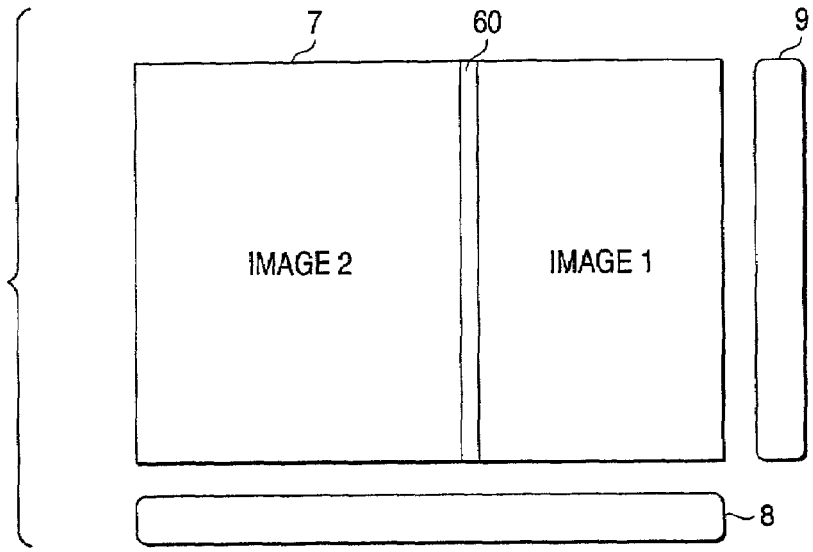
FIG. 6A shows an example of screen display obtained during frame advance operation.
Figure 6B:
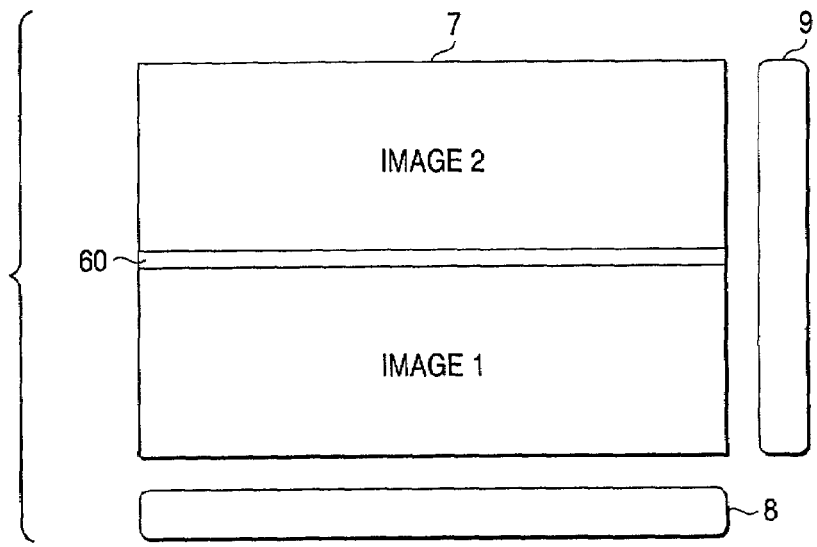
FIG. 6B shows another example of screen display obtained during frame advance operation.

Another example of control operation is changing the regenerated image displayed on the image monitor 7. FIGS. 6A and 6B shows a display example of the image monitor 7 assumed when a plurality of shot images are continuously frame-advanced. FIG. 6A is an example of frame advance in the horizontal direction while FIG. 6B is an example of frame advance in the vertical direction. Frame advance in the horizontal direction is made by moving your finger in the direction of +H or −H while keeping your finger on the touch pad 8 then moving a frame boundary 60 in the direction of +H or −H. Frame advance in the vertical direction is made by moving your finger in the direction of +V or −V while keeping your finger on the touch pad 9 then moving the frame boundary 60 in the direction of +V or −V.

To change the display magnification of a regenerated image, the touch pad 9 is used to scale up/down the image and the touch pad 8 is used to change the display area of the enlarged image. When enlarging/reducing the regenerated image, same as in shooting the image, moving your finger in the direction of +V while keeping your finger on the touch pad 9 provides a zoom-in operation; moving your finger in the direction of −V provides a zoom-out operation. Moving your finger while keeping it on the touch pad 8 while a regenerated image is enlarged can change the display area of the enlarged image.

In this way, by using the movement information in the finger-contact state as well as the contact position on the touch pads 8, 9 provides a variety of operation features. The feature to be assigned to the contact movement may be set as required depending on the operation mode of a digital camera.

While touch pads 8, 9 are provided approximately in parallel with two sides of the image monitor 7 orthogonal to each other on a digital camera shown in FIGS. 1A and 1B, either the touch pad 8 or 9 may be provided. The touch pad is not necessarily in linear shape but may be in any shape.

Figure 7:
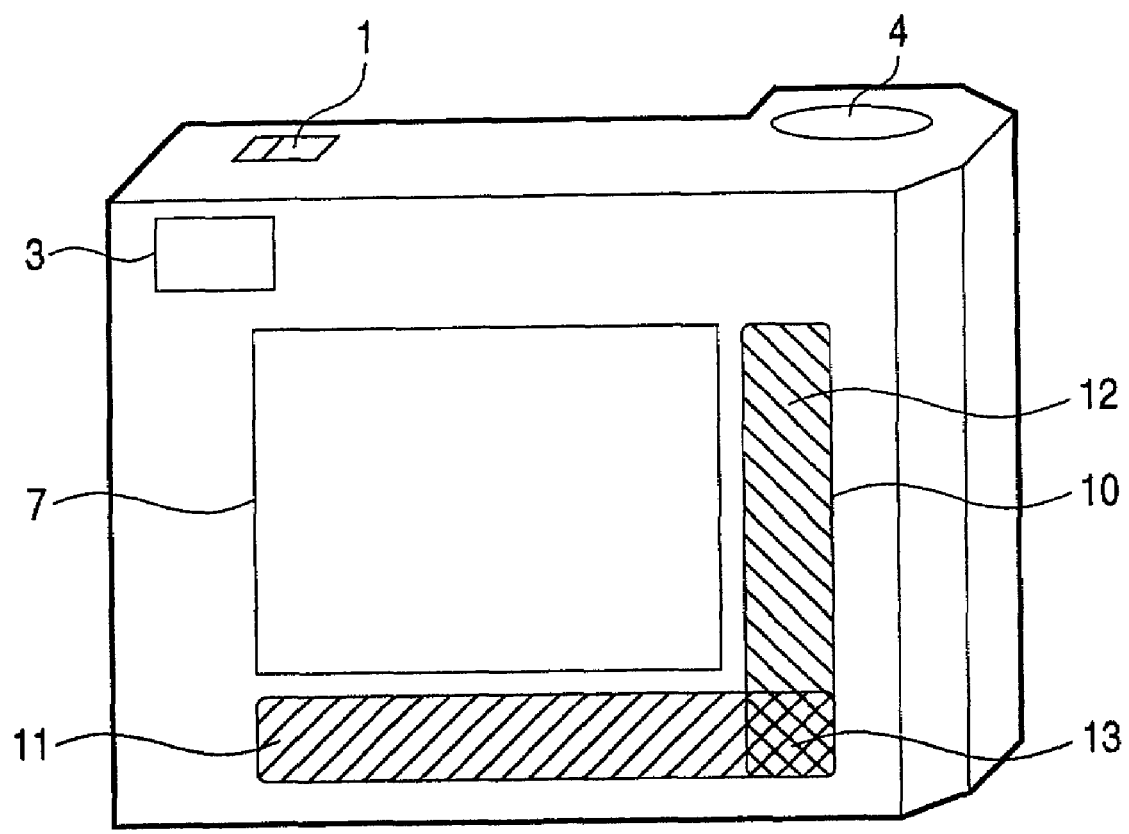
FIG. 7 shows another example of touch pad arrangement.

FIG. 7 shows a touch pad 10 in the form of the letter L provided approximately in parallel with two sides of the image monitor 7 orthogonal to each other. An area 11 of the touch pad 1 is given the same feature as that of the touch pad 8 in FIG. 1B. An area 12 is given the same feature as that of the touch pad 9. This allows control operation and input operation mentioned earlier.

An area 13 of the touch pad 10 is given a special feature because it is not in direct correspondence to the image monitor 7. An example of the special feature is controlling the validity of an input using a touch pad. That is, A touch input on the touch pad 10 is made valid when the area is touched. This configuration prevents an inadvertent contact with the touch pad resulting in an unexpected operation.

Another example of the special feature is determining a touch input in the area 13 as a direct input of preset information. This configuration allows single-touch setting of frequently used shooting conditions.

Second Embodiment

Figure 8A:
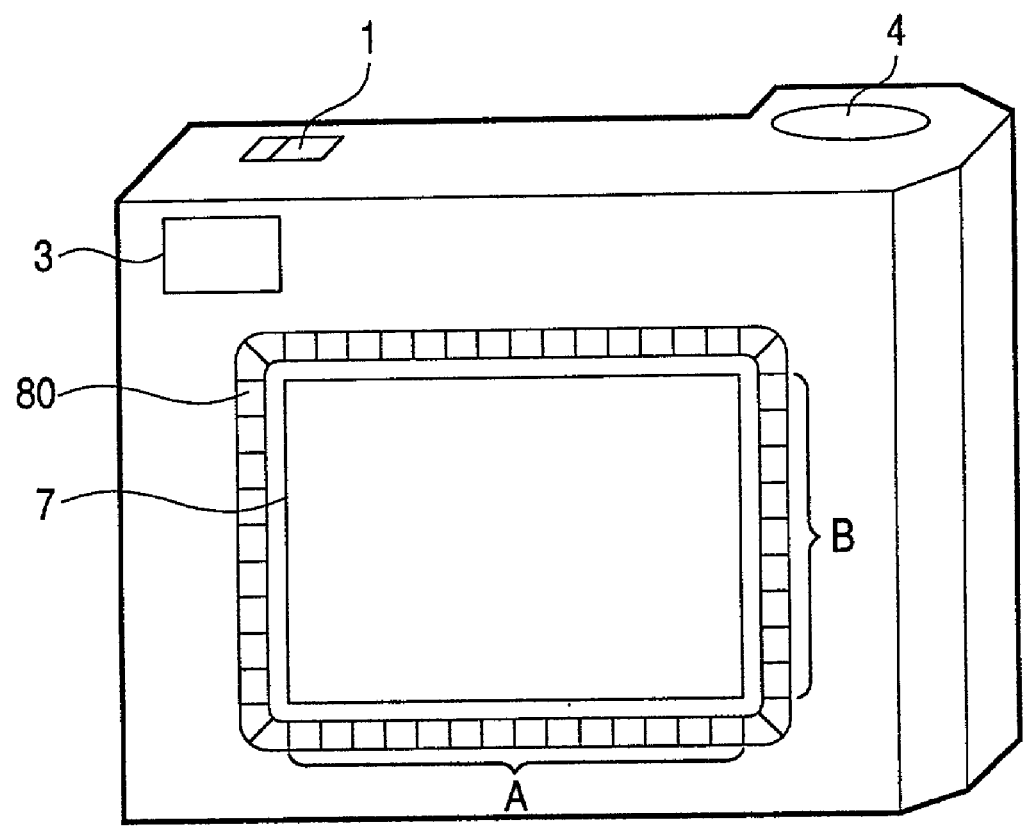
FIG. 8A shows a digital camera according to the second embodiment.
Figure 8B:
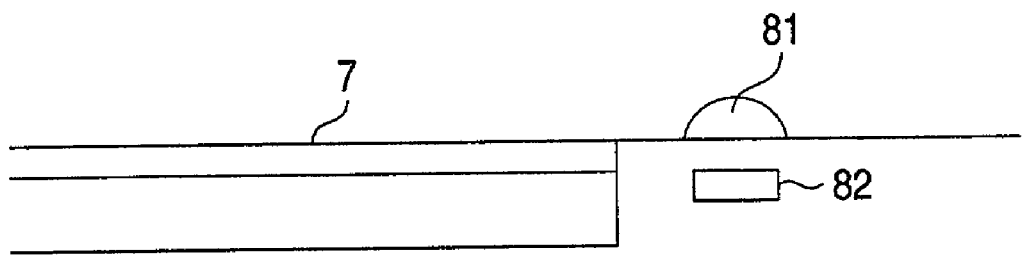
FIG. 8B shows a general sectional view of the periphery of an image monitor.
Figure 9:
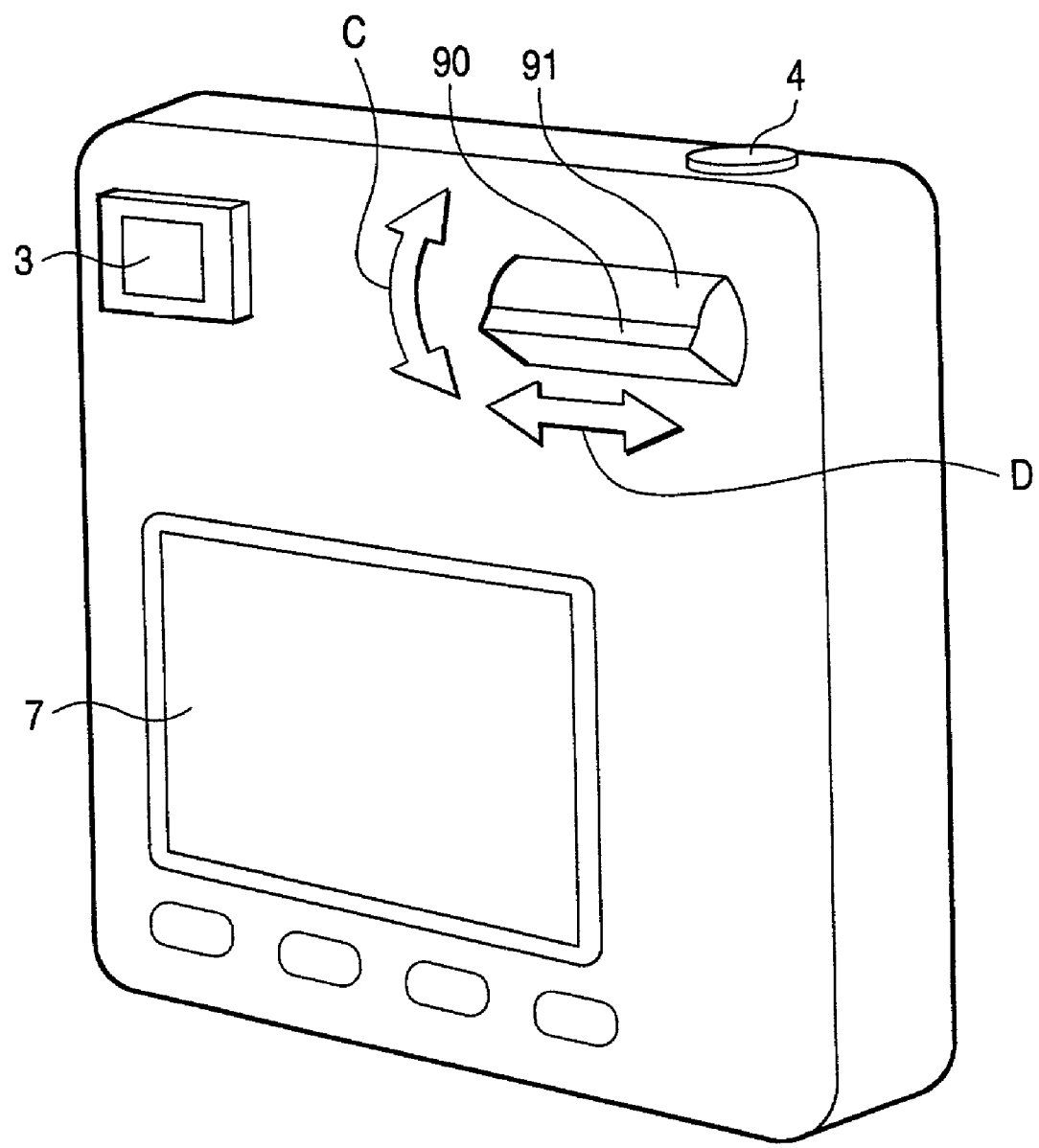
FIG. 9 shows a digital camera according to the third embodiment.

FIGS. 8A and 8B show a digital camera in the second embodiment. FIG. 8A is a rear perspective view of the digital camera. FIG. 8B is a general sectional view of the periphery of an image monitor. A digital camera in FIGS. 8A and 8B comprises a contact switch group 80 as a touch detection sensor to detect contact of a finger of an operator. The contact switch group 80 comprises a convex press section 81 and a plurality of switch members 82. A switch composing a contact switch group may be a membrane switch. Note that the switch members 82 are provided in both the area A and area B, or either of the areas A and B and the remaining sections are dummy switches having only a convex press section.

The area A of the contact switch group 80 is given the same feature as that of the touch pad 8 in FIGS. 1A and 1B. The area B is given the same feature as that of the touch pad 9 in FIGS. 1A and 1B. This allows control operation and input operation mentioned in the first embodiment. In this way, using the switch group 80 as a touch detection sensor allows contact detection in a smaller space than a touch pad. Providing a convex press section prevents contact of your finger with the surface of the image monitor 7 even when the convex press section is arranged close to the image monitor 7.

While a touch pad and a switch group is used as a touch detection sensor in the first and second embodiment, a variety of contact detection sensors are known and may be used, as described in the Japanese Patent Laid-Open Hei 11-194872/1999.

A digital camera in the third embodiment provides a touch detection sensor 90 on the surface of a tilt member of a tilt switch 91 for operating the digital camera. The tilt switch 91 is tilted in the direction of C to control the shooting magnification in shooting an image and changing the display magnification of a regenerated image in playback of an image.

The touch detection sensor 90 is composed of a contact switch group and used to control the displayed contents of a regenerated image. That is, by moving your finger while keeping it on the touch detection sensor 90 provides continuous frame advance of a plurality of shot images. The touch sensor 90 is used to change the display area of an enlarged image when the regenerated image is enlarged. The tilt switch 91 is used to change the display magnification of the regenerated image, thus allowing an enlarged image of a necessary area to be displayed with simple operation.

As understood from the foregoing description, according to the invention, it is possible to provide portable electronic apparatus with compact and low-profile apparatus design and improved operability.

What is claimed is:

1. Portable electronic apparatus having a display unit wherein
a menu mark, which changes depending on an operation mode of the portable electronic apparatus, is displayed on the display unit,
a touch input section for selecting items of the menu mark is provided including touch detection sensors arranged linearly and continuously wherein the touch input section is configured to detect continuously linear contact position signals in both horizontal and vertical directions with respect to said display unit, the touch input section being disposed around and on the bezel of said display unit wherein the bezel is not a part of the display unit and is arranged on the same surface of the display unit, wherein
one operation chosen from a group of control operation of said portable electronic apparatus and input operation that is based on the items displayed on said display unit is performed in accordance with the touch position and a movement in the touch state detected by said touch input section, wherein
said portable electronic apparatus is a digital camera for capturing a photographic image, and wherein
control operation of said portable electronic apparatus in accordance with a movement in the touch state on said touch input section includes changing the display magnification of an image displayed on said display unit.

2. Portable electronic apparatus having a display unit wherein
menu mark, which changes depending on an operation mode of the portable electronic apparatus, is displayed on the display unit,
a touch input section for selecting items of the menu mark is provided including touch detection sensors arranged linearly and continuously wherein the touch input section is configured to detect continuously linear contact position signals in both horizontal and vertical directions with respect to said display unit, the touch input section being disposed around and on the bezel of said display unit wherein the bezel is not a part of the display unit and is arranged on the same surface of the display unit, wherein one operation chosen from a group of control operation of said portable electronic apparatus and input operation that is based on the items displayed on said display unit is performed in accordance with the touch position and a movement in the touch state detected by said touch input section, wherein said portable electronic apparatus is a digital camera for capturing a photographic image, and wherein control operation of said portable electronic apparatus in the touch state on said touch input section includes changing the shooting magnification.

3. Portable electronic apparatus comprising:

a display unit wherein a touch input section is provided including touch detection sensors arranged linearly and continuously, and wherein an input operation that is based on items displayed on said display unit is performed in accordance with a touch position and a movement in the touch state which are detected by said touch input section, and in the input operation, selection item candidates of at least one of a plurality of menu marks are displayed on the display unit in accordance with the touch position, and one of the selection item candidates is selected in accordance with a destination of the movement, which is performed while the touch state is being kept, and wherein said touch input section comprises a feature area which, upon contact, validates the input operation corresponding to the selected selection item candidate, and wherein the menu mark, which changes depending on an operation mode of the portable electronic apparatus, is displayed in the display unit, the touch input section is configured to select the items of the menu marks, the touch input section is configured to detect continuously linear contact position signals in both horizontal and vertical directions with respect to the display unit, the touch input section is disposed around and on the bezel of said display unit, the bezel is not a part of the display unit and is arranged on the same surface of the display unit, one operation chosen from a group of control operation of said portable electronic apparatus and the input operation is performed in accordance with the touch position and the movement in the touch state which are detected by the touch input section, and the portable electronic apparatus includes a digital camera for capturing a photographic image.

\* \* \* \* \*